United States Patent
Cekoric, Jr. et al.

[15] 3,668,075
[45] June 6, 1972

[54] GROWTH INHIBITIONS OF SELECTIVE MYCOPLASMAS

[72] Inventors: Thomas Cekoric, Jr.; George Evans, both of Hopatcong; Ronald Searcy, Upper Montclair, all of N.J.

[73] Assignee: Hoffman-LaRoche, Inc., Nutley, N.J.

[22] Filed: Oct. 4, 1968

[21] Appl. No.: 765,028

Related U.S. Application Data

[63] Continuation-in-part of Ser. No. 676,976, Oct. 20, 1967, abandoned.

[52] U.S. Cl. ................................195/103.5, 195/100
[51] Int. Cl. .............................................C12k 1/06
[58] Field of Search ...................195/100, 103.5; 424/180

[56] References Cited

UNITED STATES PATENTS 2,694,058  11/1954  Berger ........................260/209.6

OTHER PUBLICATIONS

Stuart; " J. Clin. Path." Vol. 1. (1948) pp. 311– 314

*Primary Examiner*—A. Louis Monacell
*Assistant Examiner*—Max D. Hensley
*Attorney*—Samuel L. Welt, Jon S. Saxe, Bernard S. Leon and Gerald S. Rosen

[57] ABSTRACT

The use of certain heparinoid compounds to selectively inhibit the growth of mycoplasmas is described.

The invention provides a practical means for facilitating the selective identification of mycoplasmas. The identification of mycoplasmas isolated from man is especially useful as a diagnostic aid in prescribing treatment for diseases caused by these microorganisms.

Additionally, the invention provides a means of preventing the growth of mycoplasmas in culture media especially media used for tissue cultures in which mycoplasmas frequently occur as undesirable contaminants.

10 Claims, No Drawings

GROWTH INHIBITIONS OF SELECTIVE MYCOPLASMAS

RELATED APPLICATION

This application is a continuation-in-part of U.S. Pat. application Ser. No. 676,976, filed Oct. 20, 1967, now abandoned.

BACKGROUND OF THE INVENTION

Mycoplasmas are a group of microorganisms which are intermediate in size between bacteria and viruses. Many mycoplasma species have already been identified. Certain of these have been characterized as human strains. However, an even greater number have been characterized as animal strains. Included among the human mycoplasma species which, to date, have been characterized are, for example, *Mycoplasma hominis*, type 1 and *Mycoplasma hominis*, type 2 (*M. arthritidis*), *Mycoplasma salivarium*, *Mycoplasma fermentans*, *Mycoplasma orale*, types 1 and 2 and *Mycoplasma pneumoniae*. The latter species of mycoplasma is considered by many to be the etiologic agent in primary atypical pneumonia. Furthermore, the species *M. hominis*, type 1 has been recovered from the genitourinary tract, and its frequent occurrence in association with venereal disease, non-bacterial urethritis, cervicitis and other inflammatory diseases of the genital tract, has been reported as well as its association with exudative pharyngitis. *Mycoplasma pulmonis* (Negroni agent), while not indigenous to man, has been isolated from tissue cultures inoculated with specimens from leukemia patients. Likewise, *M. hominis*, type 2 which is occasionally isolated from human specimens, has been shown to be identical to a rodent mycoplasma, *M. arthritidis*. The rapid identification of mycoplasmas becomes extremely important in initiating the proper treatment of conditions of which mycoplasmas are the causative agent since they are resistant to many of the antibiotics and chemotherapeutic agents used for bacterial infections.

In recent years, it has been reported that mycoplasmas are present, as contaminants, in tissue cultures such as are used in the metabolic studies of cells or in the propagation of viruses. A prime contaminant has been identified as *M. hominis*, type 1. The occurrence of mycoplasma in tissue cultures furnishes a potential source for an erroneous interpretation of results since the interpretation invariably presumes that cultures are devoid of microbial contaminants.

Techniques and methods for isolating, identifying and inhibiting the growth of mycoplasmas, particularly the human strains, have become, therefore, important in the preparation and use of tissue cultures.

BRIEF SUMMARY OF THE INVENTION

The present invention is predicated upon the finding that certain heparinoid compounds, hereinafter specifically identified, selectively inhibit the growth of certain mycoplasma species. By using these heparinoid compounds in combination, groups of human mycoplasmas can be identified. In its broadest embodiment, the invention provides a means for facilitating the identification of various mycoplasma species derived from a human source. In one of its more important embodiments, the invention provides a method for the specific identification of *M. hominis*, type 1, *M. salivarium* and *M. fermentans*.

The heparinoid compounds which are used in the practice of the invention are as follows: the polyanethol sulfonic acid sodium salt; the sodium salt of sulfated polymannuronic acid; the sodium salt of sulfated polymannuronic acid methyl glycoside; and the sodium salt of sulfated polyglucuronic acid methyl ester. The polyanethol sulfonic acid sodium salt and the sodium salt of sulfated polymannuronic acid methyl glycoside are known compounds and processes for their production are disclosed in the literature. Although not a part of the present invention, the production of the sodium salt of sulfated polymannuronic acid and of the sodium salt of sulfated polyglucuronic acid methyl ester will be described hereinafter for the sake of completeness of disclosure.

While the invention will be described herein with particular reference to the use of sodium salts of the various compounds, it is to be understood that the invention is not necessarily limited to the use of such salts. Any non-toxic salt of the various compounds, which is soluble in water or saline, can be employed.

DETAILED DESCRIPTION OF THE INVENTION

The ability of the aforementioned heparinoid compounds to inhibit selectively the growth of mycoplasmas has been studied by two techniques. In the first technique, paper discs, for example, discs having a diameter of from about 6 mm. to about 8 mm. are moistened with a solution of the heparinoid compound. The moistened disc is then placed, for example, on an agar plate which contains an appropriate growth medium. The growth medium has previously been inoculated with the mycoplasma isolate to be studied. The plates are incubated in a suitable environment, e.g., at 37° C. in a moist chamber containing an atmosphere of air or a mixture of 95 percent nitrogen and 5 percent carbon dioxide, and observed over a period of time for the appearance of microscopic colonies of the microorganism. If the heparinoid compound inhibits the growth of the mycoplasma, a zone of inhibition which can be observed under the microscope will surround the disc.

In the second technique for evaluating the inhibitory properties of the heparinoid compounds to the growth of mycoplasmas, the heparinoid compound is introduced directly into the growth medium. The container which contains the growth medium, following inoculation of the medium with the mycoplasma isolate and suitable incubation, e.g., at 37° C. in a moist chamber containing an atmosphere of air or a mixture of 95 percent nitrogen and 5 percent carbon dioxide, is observed to detect the presence or absence of growth. Growth of the culture may be detected by direct observation under the microscope, by subculture or by the production of acid from the fermentation of glucose.

The present method for identifying mycoplasmas in an isolate utilizes a combination of the foregoing techniques. It has been found that the sodium salt of polyanethol sulfonate and the sodium salt of sulfated polymannuronic acid were each active mycoplasma inhibitors when tested by the disc method. Thus, for example, the exposure of various mycoplasma species to discs saturated with the sodium salt of polyanethol sulfonate resulted in the growth inhibition of the following named mycoplasmas:

*M. hominis*, type 1
*M. hominis*, type 2
*M. pulmonis*
*M. fermentans*
*M. M.*
*M. orale*, type 1
*M. orale*, type 2

The sodium salt of polyanethol sulfonate did not, however, inhibit the growth of the mycoplasma species *M. salivarium*.

The exposure of various mycoplasma species to discs saturated with the sodium salt of sulfated polymannuronic acid resulted in the growth inhibition of the following named mycoplasmas:

*M. hominis*, type 1
*M. pulmonis*
*M. fermentans*
*M. orale*, type 2

The sodium salt of sulfated polymannuronic acid did not, however, inhibit the growth of *M. hominis*, type 2; *M. salivarium*; *M. orale*, type 1; or *M. pneumoniae*.

It has been found that two of the heparinoid compounds, named heretofore, do not manifest activity as mycoplasma growth inhibitors when tested by the disc method. However, it has been found that the compounds are selective growth inhibitors when incorporated directly in the medium in which the microorganism is grown. The heparinoids which inhibit the growth of certain mycoplasmas when incorporated directly into the growth medium are the sodium salt of sulfated polyglucuronic acid methyl ester and the sodium salt of sulfated polymannuronic acid methyl glycoside. The species M. pulmonis; M. orale, type 2 and M. fermentans are not able to grow in the presence of the former while the species M. pulmonis and M. orale, type 2 are not able to grow in the presence of the latter compound. By using both the disc technique and the medium method, one can facilitate the identification of a particular mycoplasma isolate according to the following table:

penicillin and thallium acetate may be added to the medium. Their addition is optional and not necessary to the practice of this invention. Generally, penicillin is added in sufficient quantities to provide from about 100 to about 1,000 units per ml. of medium. Moreover, about 1 part by weight of thallium acetate per 2,000 parts by volume of medium is ordinarily used. This medium supports the growth of all recognized human large colony mycoplasma strains.

As indicated heretofore, the present invention provides a

INHIBITION OF:

| Compound (sodium salt of) | Method | M. hominis type 1 | M. hominis, type 2 | M. orale, type 1 | M. orale, type 2 | M. fermentans | M. salivarium | M. pneumoniae | M. pulmonis |
|---|---|---|---|---|---|---|---|---|---|
| Polyanethol sulfonate | Disc | + | + | + | + | + | 0 | + | + |
| Sulfated polymannuronic acid | do | + | 0 | 0 | + | + | 0 | 0 | + |
| Sulfated polyglucuronic acid methyl ester. | Medium | 0 | 0 | 0 | + | + | 0 | 0 | + |
| Sulfated polymannuronic acid methyl glycoside. | do | 0 | 0 | 0 | + | 0 | 0 | 0 | + |

+ = inhibition (no growth).
0 = no inhibition (growth).

The manner in which the present invention is carried out will be readily appreciated by persons skilled in the art. In the disc technique, the heparinoid compound is first dissolved in water or in saline solution. The concentration of the solution, thus prepared, is not particularly critical. However, there is no particular advantage in using a solution containing greater than about 5.0 percent by weight of the sodium salt of polyanethol sulfonate or a solution containing more than about 1.0 percent by weight of the sodium salt of sulfated polymannuronic acid. In general, a solution containing from about 0.5 percent to about 5.0 percent by weight of the heparinoid compound will be employed. The solution, thus obtained, is used to moisten paper discs having a diameter, for example, of from about 6 mm. to about 8 mm. Preferably, each disc is moistened with from about 0.01 ml. to about 0.03 ml. of the solution to provide from about 0.1 mg. to about 1.0 mg. of heparinoid compound per disc. The discs are placed on the agar plates which contain a conventional growth medium which is inoculated with the mycoplasma isolate. The discs can be placed on the plates while still moist or, in the alternative, the moistened discs may be dried before use. In the dry state they have the advantage of providing a stable and convenient form of the reagent.

In those cases where the disc method is not employed, i.e., where the heparinoid compounds in use are the sodium salt of sulfated polyglucuronic acid methyl ester and/or the sodium salt of sulfated polymannuronic acid methyl glycoside, the heparinoid is added to the culture medium ingredients. This is true also in the case of the sodium salt of polyanethol sulfonate and the sodium salt of sulfated polymannuronic acid which are inhibitors to the aforementioned mycoplasmas by either the disc or direct addition to the medium technique. The quantity of heparinoid compound which is incorporated into the medium is not critical. Generally, however, from about 0.5 percent to about 1.0 percent by weight of the heparinoid compound will be incorporated into the medium. The heparinoid may be incorporated into either a broth (liquid) medium or an agar (gel) medium. Generally, it is preferred to incorporate the heparinoid in an agar medium, which is distributed in plates, allowed to solidify and, thereafter, inoculated with the mycoplasma isolate and incubated. A control plate is prepared in a manner identical to the test plate except that the heparinoid compound is not incorporated into the medium.

In general, any medium in which mycoplasmas are conventionally grown is used in the practice of the present invention. In the preferred embodiment of the invention, however, the widely known medium of Hayflick medium is employed. This medium utilizes a basic PPLO medium, which is prepared, e.g., by dissolving 23.8 grams of Difco Bacto-PPLO Agar dehydrated in 700 ml. distilled water. This medium is sterilized by autoclaving at 15 pounds pressure for 15 minutes and is supplemented with 200 ml. of pooled horse serum and 100 ml. of a 25 percent aqueous extract of fresh baker's yeast. Furthermore, in order to prevent bacterial contamination, significant diagnostic tool. By using the aforementioned heparinoids in the manner described herein, one can facilitate the identification of human mycoplasma species. Certain species of mycoplasmas can be identified specifically, e.g., M. hominis, type 1 and M. salivarium and M. fermentans. The other species are differentiated into groups for further delineation by other diagnostic tests. Furthermore, utilizing the heparinoid compounds which inhibit the growth thereof, several mycoplasma species, especially M. hominis, type 1, can be eliminated from tissue cultures. This can be accomplished by adding the heparinoid compound or compounds to the tissue culture medium at a final concentration of 0.05 to 1.0 percent by weight.

For a fuller understanding of the nature and objects of this invention, reference may be had to the following examples which are given merely as an illustration of the invention and are not to be construed in a limiting sense.

EXAMPLE 1

In this Example, Hayflick agar medium was added as a thin layer to a conventional Petri plate having a diameter of 60 mm. The medium was inoculated by spreading 0.2 ml. of a 48 hour broth culture of M. hominis, type 1 thereon. After allowing the inoculum to dry, two paper discs, each having a diameter of approximately 6.5 mm. were placed on the plate in contact with the inoculated medium. One of the discs had been previously saturated with the sodium salt of polyanethol sulfonate, while the other had been saturated with the sodium salt of sulfated polymannuronic acid. The respective salts were introduced onto the discs in the form of 1.0 percent by weight solutions in saline. A sufficient quantity (0.02 ml.) of solution was used in each instance to provide the discs with approximately 0.2 mg. of the heparinoid compound.

The medium used in the example, namely, Hayflick medium, was composed of a basic PPLO medium, i.e., 700 ml. of Difco Bacto-PPLO Agar, to which was added 100 ml. of pooled horse serum and 100 ml. of 25 percent extract of fresh baker's yeast. To this medium there was added 200 units per ml. of penicillin and 1 part thallium acetate per 2,000 units of medium. The latter ingredients were added to avoid bacterial contamination.

The plate was allowed to incubate at 37° C. in a humid chamber containing an atmosphere of air. Periodically they were observed under the microscope at 65 to 100 times magnification for the formation of mycoplasma colonies. It was found that a zone of inhibition formed around the disc saturated with the sodium salt of polyanethol sulfonate and that a zone of inhibition also formed around the disc saturated with the sodium salt of sulfated polymannuronic acid. The formation of the zone of inhibition around each disc indicates that the sodium salt of polyanethol sulfonate and the sodium salt of sulfated polymannuronic acid each inhibit the growth of the mycoplasma M. hominis, type 1.

A series of experiments were carried out, in the manner described heretofore using, in lieu of the M. hominis, type 1 containing broth, broths containing the mycoplasmas *M. hominis*, type 2 (*M. arthritidis*); *M. orale*, type 1; *M. orale*, type 2; *M. fermentans*; *M. salivarium*, *M. pneumoniae*; and *M. pulmonis*. The plates were incubated under appropriate conditions and for a sufficient length of time to obtain optimal growth. It was determined that both of the aforementioned heparinoid compounds inhibited the growth of the mycoplasmas *M. orale*, type 2; *M. pulmonis* and *M. fermentans*. The growth of the mycoplasmas *M. hominis*, type 2; *M. pneumoniae* and *M. orale*, type 1 was only inhibited by the disc containing the sodium salt of polyanethol sulfonate. *M. salivarium* was the only species not inhibited by either heparinoid.

um salt of sulfated polymannuronic acid methyl glycoside was *M. pulmonis* and *M. orale*, type 2.

The sodium salt of sulfated polymannuronic acid and sodium polyanethol sulfonate, each of which was shown in Example 1 to be active as mycoplasma growth inhibitors by the disc method, were also tested to determine if they inhibited mycoplasma growth when added directly to the medium. It was found that, in the case of each compound, the mycoplasma, whose growth was inhibited when tested by the disc method, was unable to grow in the inhibitor-containing medium.

The following table summarizes the results of these experiments:

INHIBITION OF:

| Compound (sodium salt of) | Method | *M. hominis*, type 1 | *M. hominis*, type 2 | *M. orale*, type 1 | *M. orale*, type 2 | *M. fermentans* | *M. salivarium* | *M. pneumoniae* | *M. pulmonis* |
|---|---|---|---|---|---|---|---|---|---|
| Polyanethol sulfonate | Medium | + | + | + | + | + | 0 | + | + |
| Sulfated polymannuronic acid | do | + | 0 | 0 | + | + | 0 | 0 | + |
| Sulfated polyglucuronic acid methyl ester | do | 0 | 0 | 0 | + | + | 0 | 0 | + |
| Sulfated polymannuronic acid methyl glycoside | do | 0 | 0 | 0 | + | 0 | 0 | 0 | + |

+ = Inhibition (no growth).
0 = No inhibition (growth).

In the table which follows hereinafter, there is set forth, in mm., the zone of inhibition which formed when 6.5 mm. discs saturated with the aforementioned heparinoid compounds were placed in contact with plates of Hayflick agar medium inoculated with appropriate mycoplasma-containing broths:

The sodium salt of polyanethol sulfonate used herein was produced as described in Example 1 of U.S. Pat. No. 1,907,371. The sodium salt of sulfated polymannuronic acid methyl glycoside used herein was produced as described in Example 5 of U.S. Pat. No. 2,694,058.

ZONE OF INHIBITION (mm.)*

| Compound | *M. hominis*, type 1 | *M. hominis*, type 2 | *M. fermentans* | *M. orale*, type 1 | *M. orale*, type 2 | *M. salivarium* | *M. pulmonis* | *M. pneumoniae* |
|---|---|---|---|---|---|---|---|---|
| A | 12 | 11 | 14 | 12 | 15 | 0 | >25 | 21 |
| B | 8 | 0 | 15 | 0 | 13 | 0 | 13 | 0 |

*Zone size includes diameter of disc (6.5 mm.).
A = Sodium salt of polyanetholsulfonate (5% on disc).
B = Sodium salt of sulfated polymannuronic acid (1% on disc).

EXAMPLE 2

In this example, 50 ml. of Hayflick agar medium containing 0.5 percent by weight of sodium salt of sulfated polyglucuronic acid methyl ester was first prepared. In this preparation, 0.25 gram of sodium salt of sulfated polyglucuronic acid methyl ester and 1.2 gram of Bacto-PPLO Agar was added to 35 ml. of distilled water. The mixture was heated to dissolve the ingredients and the solution, thus formed, was sterilized by autoclaving at 15 pounds pressure for a period of about 15 minutes. At the end of that period of time, the medium was allowed to cool to a temperature of about 45° C., following which 10 ml. of sterile horse serum and 5 ml. of fresh, sterile 25 percent yeast extract was aseptically added. Penicillin G was then added to the mixture to a final concentration of 200 units per ml.

While being maintained at a temperature of 43° to 45° C., the medium, prepared as described in the preceding paragraph, was poured into a 100 mm. standard plastic Petri dish and the medium was allowed to solidify at room temperature. The plate was then divided into eight sectors. The medium in each sector was then inoculated with 0.01 ml. of a 48 hour to 96 hour broth culture (5 day culture in the case of *M. pneumoniae*) of a different mycoplasma species and incubated for a suitable period at 37° C. The ability of the sodium salt of sulfated polyglucuronic acid methyl ester to inhibit the growth of the mycoplasma species *M. hominis*, type 1, *M. hominis*, type 2, *M. pulmonis*, *M. fermentans*, *M. pneumoniae*, *M. salivarium*, *M. orale*, type 1 and *M. orale*, type 2 was determined. It was found that, of the mycoplasma species tested, the only species which were not able to grow in the presence of the sodium salt of sulfated polyglucuronic acid methyl ester were the species *M. pulmonis*, *M. fermentans* and *M. orale*, type 2.

The foregoing procedure was repeated using the sodium salt of sulfated polymannuronic acid methyl glycoside as the growth inhibitor. It was determined that the only mycoplasma species which was not able to grow in the presence of the sodi- For the sake of completeness, the preparation of the sodium salt of sulfated polyglucuronic acid methyl ester and the preparation of the sodium salt of sulfated polymannuronic acid is set forth hereinafter. It should be understood, however, that neither the compounds themselves, nor the processes for their preparation, are part of the present invention.

PREPARATION OF THE SODIUM SALT OF SULFATED POLYMANNURONIC ACID a. Preparation of Alginic Acid Fifty grams of commercial sodium alginate was suspended in one liter of warm water in a Waring blender and stirred to form a clear thick gel. Thereafter, 1.0 N hydrochloric acid was added to the gel with stirring, until acid to Congo red (pH about 3.5). The precipitate was allowed to settle and the supernatant liquor was siphoned off. The precipitate was washed with three 500 cc. portions of ethanol while in the blender— with stirring and siphoning as previously. Finally, the amorphous powder is collected on a sintered glass funnel, washed with ethanol, and dried in high vacuo over anhydrous calcium chloride. By the described procedure, alginic acid was obtained as a dry free-flowing powder.

b. Sulfation of Alginic Acid

A mixture of chlorosulfonic acid and pyridine was prepared at a temperature of 0° to 5° C. by the careful addition of 140 cc. of chlorosulfonic acid to 700 cc. of dry pyridine. 20 Grams of powdered alginic acid was then added while keeping the temperature between 0° and 10° C. After the addition, the mixture was stirred for one hour at room temperature, following which it was heated with constant stirring at 70° to 75° C. for 6 hours. The reaction mixture was then allowed to stand at room temperature overnight. The crude pyridine salt of the sulfated alginic acid was isolated by heating the reaction mixture to 70° C. and adding the warm mixture in a fine stream to 3 liters of methanol with constant stirring. The precipitate was washed with 1 liter portions of methanol by trituration and the washed precipitate was collected by centrifugation. There was thus obtained, the crude pyridine salt of sulfated alginic acid.

The pyridine salt was purified by dissolving it in 150 cc. of water and the solution was clarified by filtration through an asbestos pad. The purified pyridine salt was isolated by the addition of the filtrate to 1,500 cc. of methanol with constant stirring.

The purified pyridine salt, produced as described in the preceding paragraph, was converted to the sodium salt by dissolving it in 100 cc. of water, cooling the solution to 5° C. and adding 6 N sodium hydroxide, while maintaining the temperature at about 5° C., until the pH of the solution was about 9.5. The alkaline solution was then added rapidly to 10 volumes of methanol with constant stirring to precipitate the sodium salt. The salt obtained was purified further by dissolving it in water and precipitating it with methanol as previously described. The sodium salt of the sulfuric acid ester of polymannuronic acid (alginic acid) was obtained as a light yellow free-flowing powder when dried in high vacuo over anhydrous $CaCl_2$.

PREPARATION OF SODIUM SALT OF SULFATED POLYGLUCURONIC ACID METHYL ESTER a. 50 Grams of commercial oxidized cellulose (10–12 percent carboxyl) is suspended in 500 cc. of 5 percent HCl in methanol and the mixture stirred under reflux for 96 hours. The mixture was then cooled and the precipitate was collected by centrifugation and washed with several volumes of methanol and finally dried over anhydrous calcium chloride in vacuo. There was obtained a degraded oxidized cellulose ester.

b. To a mixture of 74 cc. of chlorosulfonic acid and 430 cc. of dry pyridine prepared at 0° to 5° C. was added, with constant stirring, 20 grams of the degraded oxidized cellulose ester produced as described in the preceding paragraph. The mixture was heated with stirring at 80° to 85° C. for 6 hours. The reaction mixture was allowed to stand at room temperature for 17 hours. The crude pyridine salt of the sulfated product was isolated from the reaction mixture by adding the warmed reaction mixture (60° to 70° C.) to 1.5 liters of methanol with stirring. The crude pyridine salt that separates was collected by centrifugation and washed by trituration and decantation with several volumes of methanol. To further purify the pyridine salt it was dissolved in 100 cc. of water and clarified by filtration through an asbestos pad and the purified pyridine salt recovered by precipitation with methanol as previously described.

The pyridine salt was collected by centrifugation and washed with several volumes of methanol and finally dried over calcium chloride in vacuo. The pyridine salt was converted to the sodium salt by dissolving it in 100 cc. of water and adding 6N NaOH until the pH was 9.5, the temperature being maintained between 5° and 10° C. during the addition of the alkali. The alkaline solution was then added to 10 volumes of methanol to precipitate the sodium salt. The salt was collected by centrifugation and washed with several volumes of methanol and further purified by dissolving it in 100 cc. of water, filtering it through as asbestos pad, and reprecipitating the purified sodium salt with 10 volumes of methanol. The salt is collected, as previously described, by centrifugation, washed with methanol and finally dried in vacuo over anhydrous calcium chloride.

The product, thus obtained, was the sodium salt of sulfated polyglucuronic acid methyl ester having a viscosity of 0.185 cps.

We claim:

1. A composition for selectively inhibiting the growth of mycoplasmas in culture media comprising (1) a broth or agar medium and (2) a compound selected from the group consisting of a salt of polyanethol sulfonic acid, a salt of sulfated polymannuronic acid, a salt of sulfated polymannuronic acid methyl glycoside and a salt of sulfated polyglucuronic acid methyl ester, the said compound comprising from about 0.5 percent to about 1.0 percent of the weight of said composition.

2. A composition for selectively inhibiting the growth of mycoplasmas in culture media comprising a disc impregnated with a compound selected from the group consisting of a salt of polyanethol sulfonic acid and a salt of sulfated polymannuronic acid, there being present on such disc from about 0.1 mg. to about 1.0 mg of the compound.

3. A process for selectively inhibiting the growth of mycoplasmas selected from the group consisting of *M. hominis*, type 1; *M. hominis*, type 2 (*M. arthritidis*); *M. fermentans*; *M. pulmonis*; *M. pneumoniae*; *M. orale*, type 2; *M. orale*, type 1; and mixtures thereof, which comprises contacting a broth or agar medium containing the mycoplasma with a salt of polyanethol sulfonic acid, there being used in said process, based on the weight of the medium, from about 0.5 percent to about 1.0 percent of the polyanethol sulfonic acid salt, incubating at about 37° C. and observing the growth of the culture.

4. A process of claim 3 wherein the salt of polyanethol sulfonic acid is introduced into the medium impregnated on a disc.

5. The process of claim 4 wherein the disc contains from about 0.1 mg. to about 1.0 mg. of the salt of polyanethol sulfonic acid.

6. A process for selectively inhibiting the growth of a mycoplasma selected from the group consisting of *M. hominis*, type 1; *M. orale*, type 2; *M. fermentans*; *M. pulmonis*; and mixtures thereof which comprises contacting a broth or agar medium containing the mycoplasma with a salt of sulfated polymannuronic acid, there being used in said process, based on the weight of the medium from about 0.5 percent to about 1.0 percent of the sulfated polymannuronic acid salt, incubating at about 37° C. and observing the growth of the culture.

7. The process of claim 6 wherein the salt of sulfated polymannuronic acid is introduced into the medium impregnated on a disc.

8. The process of claim 7 wherein the disc contains from about 0.1 mg. to about 0.2 mg. of the salt of sulfated polymannuronic acid.

9. A process for selectively inhibiting the growth of a mycoplasma selected from the group consisting of *M. fermentans*; *M. orale*, type 2; and *M. pulmonis* which comprises contacting a broth or agar medium containing the mycoplasma with a salt of sulfated polyglucuronic acid methyl ester, there being used in said process, based on the weight of the medium, from about 0.5 percent to about 1.0 percent of the sulfated polyglucuronic acid methyl ester salt, incubating at about 37° C. and observing the growth of the culture.

10. A process for selectively inhibiting the growth of the mycoplasma species *M. pulmonis* and *M. orale*, type 2 which comprises contacting a broth or agar medium containing the mycoplasma with a salt of sulfated polymannuronic acid methyl glycoside, there being used in said process, based on the weight of the medium, from about 0.5 percent to about 1.0 percent of the sulfated polymannuronic acid methyl glycoside salt, incubating at about 37° C. and observing the growth of the culture.

* * * * *